(12) United States Patent
Satou

(10) Patent No.: US 7,933,563 B2
(45) Date of Patent: Apr. 26, 2011

(54) COMMUNICATION SYSTEM, COMMUNICATION TERMINAL, SERVER, COMMUNICATION METHOD TO BE USED THEREIN AND PROGRAM THEREFOR

(75) Inventor: Naoki Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 956 days.

(21) Appl. No.: 11/719,631

(22) PCT Filed: Nov. 17, 2005

(86) PCT No.: PCT/JP2005/021492
§ 371 (c)(1),
(2), (4) Date: May 17, 2007

(87) PCT Pub. No.: WO2006/054778
PCT Pub. Date: May 26, 2006

(65) Prior Publication Data
US 2009/0156162 A1 Jun. 18, 2009

(30) Foreign Application Priority Data
Nov. 17, 2004 (JP) ................. 2004-332542

(51) Int. Cl.
*H04B 1/34* (2006.01)
(52) U.S. Cl. ............... 455/90.2; 455/519; 455/556.1; 455/418; 709/203; 709/224
(58) Field of Classification Search .......... 455/518, 455/519, 424, 425, 412.1, 456.5, 456.6, 412.2, 455/414.1, 406, 90.2; 705/26, 41, 5, 80, 705/37, 27; 709/203, 245, 223, 224, 206; 370/244, 410, 389, 395, 252, 338
See application file for complete search history.

(56) References Cited

U.S. PATENT DOCUMENTS

| | | | | |
|---|---|---|---|---|
| 5,936,944 A | * | 8/1999 | Shiraishi et al. | 370/244 |
| 2002/0118398 A1 | * | 8/2002 | Tanimoto | 358/407 |
| 2004/0151126 A1 | * | 8/2004 | Matsubara | 370/252 |
| 2004/0246965 A1 | * | 12/2004 | Westman et al. | 370/392 |
| 2007/0041557 A1 | * | 2/2007 | Chatterjee et al. | 379/218.01 |

FOREIGN PATENT DOCUMENTS

| | | | |
|---|---|---|---|
| JP | 2000-148316 A | 5/2000 |
| JP | 2001-339461 A | 12/2001 |
| JP | 2002-153668 A | 5/2002 |
| JP | 2003-158775 A | 5/2003 |
| JP | 2003-189009 A | 7/2003 |
| JP | 2003-526275 A | 9/2003 |
| JP | 2004-54340 A | 2/2004 |

* cited by examiner

*Primary Examiner* — Tan Trinh
(74) *Attorney, Agent, or Firm* — Sughrue Mion, PLLC

(57) ABSTRACT

Terminals 1 and 2-1 to 2-*n* refer to information on the state of the terminals 1 and 2-1 to 2-*n* and a user to add functions for modifying the operation of the terminal and processing data thereby allowing the operation of the terminal to be modified, and the communication data to be processed, when the state information is in a specific condition. A server 3 accesses the information on the state of the terminals 1 and 2-1 to 2-*n* and the user on the side of the server 3, extracts terminal group information under a specific condition, generates a new group, and adds a presence linking function for performing registration with a group management function, thereby allowing the above state information to be used to generate a dynamic group.

54 Claims, 10 Drawing Sheets

US 7,933,563 B2

COMMUNICATION SYSTEM, COMMUNICATION TERMINAL, SERVER, COMMUNICATION METHOD TO BE USED THEREIN AND PROGRAM THEREFOR

CROSS-REFERENCES TO RELATED APPLICATIONS

This application is based upon and claims the benefit of priority from Japanese patent application No. 2004-332542, filed on Nov. 17, 2004, the disclosure of which is incorporated herein in its entirety by reference.

FIELD OF THE INVENTION

The present invention relates to a communication system, a communication terminal, a server, a communication method to be used therein and a program therefor; more particularly, it relates to a communication system for performing one-to-one communication and group communication using a mobile terminal.

DESCRIPTION OF THE RELATED ART

Regarding this type of communication system, in related art, systems exist, which use mobile terminals to realize a transceiver type (half-duplex) one-to-one and group communication system [PTT (Push-To-Talk) system] over a mobile phone network (see e.g. National Publication of International Patent Application No. 2003-526275, hereinafter, referred to as Patent Document 1).

In this PTT system, which comprises terminals and servers on a network, data sent from the terminal is delivered via the server to the terminal of the relevant party. When the system is used for transmission to a group, the data is copied in the server and sent to each terminal associated with the group.

On the other hand, regarding the above communication system, systems exist, wherein, in a system comprising terminals and networks, servers for managing the state (presence) of the terminals and users are disposed on the network, to realize, based on presence information, changes in the destination by the network side device, and processing of delivery data suited to the function of the delivery destination terminal (see e.g. Japanese Patent Laid-Open No. 2003-189009, hereinafter, referred to as Patent Document 2).

With the related art communication systems described above, in the cases of the techniques described in Patent Documents 1 and 2 above, as there are no functions for managing the state of the terminal and the state of the user, nor functions for using the information on the state to carrying out modifications to the operation of the terminal and on terminal processing of the data on the terminal side, there is the problem that changes to the operation of the terminal according to the state of the terminal and the state of the user, and processing of data on the terminal side cannot be carried out.

In addition, with related art communication systems, in the cases of the techniques described in Patent Documents 1 and 2 above, as the data is processed on the server side, when numerous requests occur at the same time, since all the processing has to be performed by the server, there is the problem that the load on the server side is sometimes high.

Moreover, with related art communication systems, in the cases of the techniques described in Patent Documents 1 and 2 above, there are no functions for using information on the state of the terminal and the state of the user to create groups automatically, there is the problem that groups cannot be created automatically because the groups for carrying out group communication are created beforehand by the user and are limited to groups registered with the server.

Furthermore, with related art communication systems, in the cases of the techniques described in Patent Documents 1 and 2 above, there are no functions for downloading software for providing missing functions from the outside when the terminal does not have the functions, nor functions for automatically downloading a required program according to the state of the terminal and the state of the user, there is the problem that only processing using functions, which the terminal has beforehand, can be carried out on the terminal side.

Consequently, an object of the present invention is to provide a communication system, a communication terminal, a communication method to be used therein and a program therefor, that solve the above problems and allow a modification to the operation of the terminal and an on terminal processing of communication data to be performed.

Another object of the present invention is to provide a communication system, a communication terminal, a communication method to be used therein and a program therefor, that allow the load on the server side due to data processing to be reduced.

In addition, another object of the present invention is to provide a communication system, a communication terminal, a server, a communication method to be used therein and a program therefor, that allow a communication delivery group to be created automatically using presence information.

Furthermore, yet another object of the present invention is to provide a communication system, a communication terminal, a server, a communication method to be used therein and a program therefor, that are capable of realizing a function lacking on the terminal by software download to enhance the functions of the terminal.

SUMMARY OF THE INVENTION

According to an exemplary aspect of the invention, a communication system in which a server receives data from a communication terminal on the sending side through a network, and delivers the data to a communication terminal on the receiving side through said network, wherein
said communication terminal comprises holding unit which holds presence information representing the state information of said communication terminal and a user, and unit which modifies the operation of said communication terminal and performing send/receive data processing when the presence information held in said holding unit meets a specific condition.

According to another exemplary aspect of the invention, said communication terminal comprises sending unit which sends to said server presence information held in said holding unit, and said server comprises linking unit which uses the presence information from said communication terminal to create a group of communication terminals that perform communication.

According to another exemplary aspect of the invention, said communication terminal comprises download unit which downloads from said server a program for performing modification of the operation of said communication terminal and send/receive data processing, and an execution unit which executes the program downloaded from said server by said download unit.

According to another exemplary aspect of the invention, a communication terminal for receiving data from a sending side through a server and a network, and sending the data to a receiving side through said server and said network, comprises holding unit which holds presence information representing the state information of the terminal and a user, and unit which modifies the operation of said terminal and performing send/receive data processing when the presence information held in said holding unit meets a specific condition.

According to another exemplary aspect of the invention, the communication terminal comprises sending unit which sends presence information held in said holding unit to said server to cause the presence information to be used to create in said server a group of communicating terminals.

According to another exemplary aspect of the invention, the communication terminal comprises download unit which downloads from said server a program for performing modification of the operation of the terminal and send/receive data processing, and an execution unit which executes the program downloaded from said server by said download unit.

According to another exemplary aspect of the invention, a server for receiving data from a communication terminal on the sending side through a network, and delivering the data to a communication terminal on the receiving side through the network, comprises linking unit which uses the presence information held in holding unit of said communication terminal and representing the state information of said communication terminal and a user to create a group of terminals that perform communication.

According to another exemplary aspect of the invention, the server comprises download unit which transmits a program to said communication terminal when download of said program for modifying the operation of said communication terminal and processing send/receive data is requested.

According to another exemplary aspect of the invention, a communication method used in a communication system in which a server receives data from a communication terminal on the sending side through a network, and delivers the data to a communication terminal on the receiving side through said network, comprising said communication terminal performing the steps of:

holding presence information representing the state information of said communication terminal and a user in holding unit, and modifying the operation of said communication terminal and performing send/receive data processing when the presence information held in said holding unit meets a specific condition.

According to another exemplary aspect of the invention, said communication terminal sends to said server presence information held in said holding unit, and said server uses the presence information from said communication terminal to create a group of terminals that perform communication.

According to another exemplary aspect of the invention, said communication terminal performing the steps of: downloading from said server a program for performing modification of the operation of said communication terminal and send/receive data processing, and executing the program downloaded from said server.

According to another exemplary aspect of the invention, a program for a communication method used in a communication system in which a server receives data from a communication terminal on the sending side through a network, and delivers the data to a communication terminal on the receiving side through the network, making a computer on said communication terminal side perform the functions of:

holding presence information representing the state information of said communication terminal and a user in holding unit, and modifying the operation of said communication terminal and performing send/receive data processing when the presence information held in said holding unit meets a specific condition.

According to another exemplary aspect of the invention, the program makes a computer on said server side perform the function of using the presence information from said communication terminal to create a group of communication terminals that perform communication.

According to another exemplary aspect of the invention, the program makes the computer on said communication terminal side perform functions of downloading from said server a program for performing modification of the operation of said communication terminal and send/receive data processing, and executing the program downloaded from said server.

More specifically, the communication system of the present invention has, in a system for one-to-one communication and group communication using a mobile terminal, terminal operation modification unit which refers to state information (hereinafter, referred to as presence information) of terminal and user to modify the operation of a terminal, and data processing unit which processes data.

In the communication system of the present invention, a configuration such as described above is adopted, and modification of the operation of the terminal and processing of data are carried out while referring to presence information, thereby enabling modification of the operation of the terminal and on terminal processing of communication data, allowing the load on the server side due to the data processing to be reduced.

The communication system of the present invention has also a presence linking unit which refers to presence server information available on the server to perform, based on the information, registration of a new group with a group management server.

In the communication system of the present invention, a configuration such as described above is adopted and a new communication group is created based on the presence information, thereby allowing a communication delivery group to be created automatically using the presence information.

In addition, in the communication system of the present invention, a configuration such as described above is adopted, and the terminal has unit which downloads programs, unit which holds the programs, and unit which executes the programs, and the server has a program download server.

In the communication system of the present invention, a configuration such as described above is adopted, and a program that provides a function lacking on the terminal is downloaded and executed, thereby realizing a function lacking on the terminal by software download to enhance the functions of the terminal.

In the communication system of the present invention, the terminal has terminal operation modification unit which refers to presence information to modify the operation of the terminal, and data processing unit, the terminal operation modification unit which refers to presence information, and if there is presence information corresponding to a separately instructed condition, carrying out separately instructed operation and performing modification of the terminal operation under a specific condition, and processing of data by the data processing unit, thereby enabling the modification of the terminal operation and on terminal processing of the communication data, and allowing the load on the server side due to the data processing to be reduced.

Further, in the communication system of the present invention, having a presence linking unit which refers to presence server information available on the server and, based on the information, registering a new group with the group management server, to extract, based on the presence information of each terminal registered with the presence server, a terminal that meets the separately instructed conditions, and create a new communication group automatically, allows a communication delivery group to be created automatically using the presence information.

Additionally, in the communication system of the present invention, having unit which downloads programs, unit which holds the programs, and unit which executs the programs on the terminal, and having a program download server on the server allow functions lacking on the terminal to be realized by software download, enhancing the functions of the terminal.

As an example of such terminal function enhancement, for instance, when data that cannot be interpreted by the terminal are received, downloading and executing a program for determining the new data type, and a program for enabling processing of the data that cannot be processed by the terminal may be considered.

DESCRIPTION OF EXEMPLARY EMBODIMENT

Figure 1:
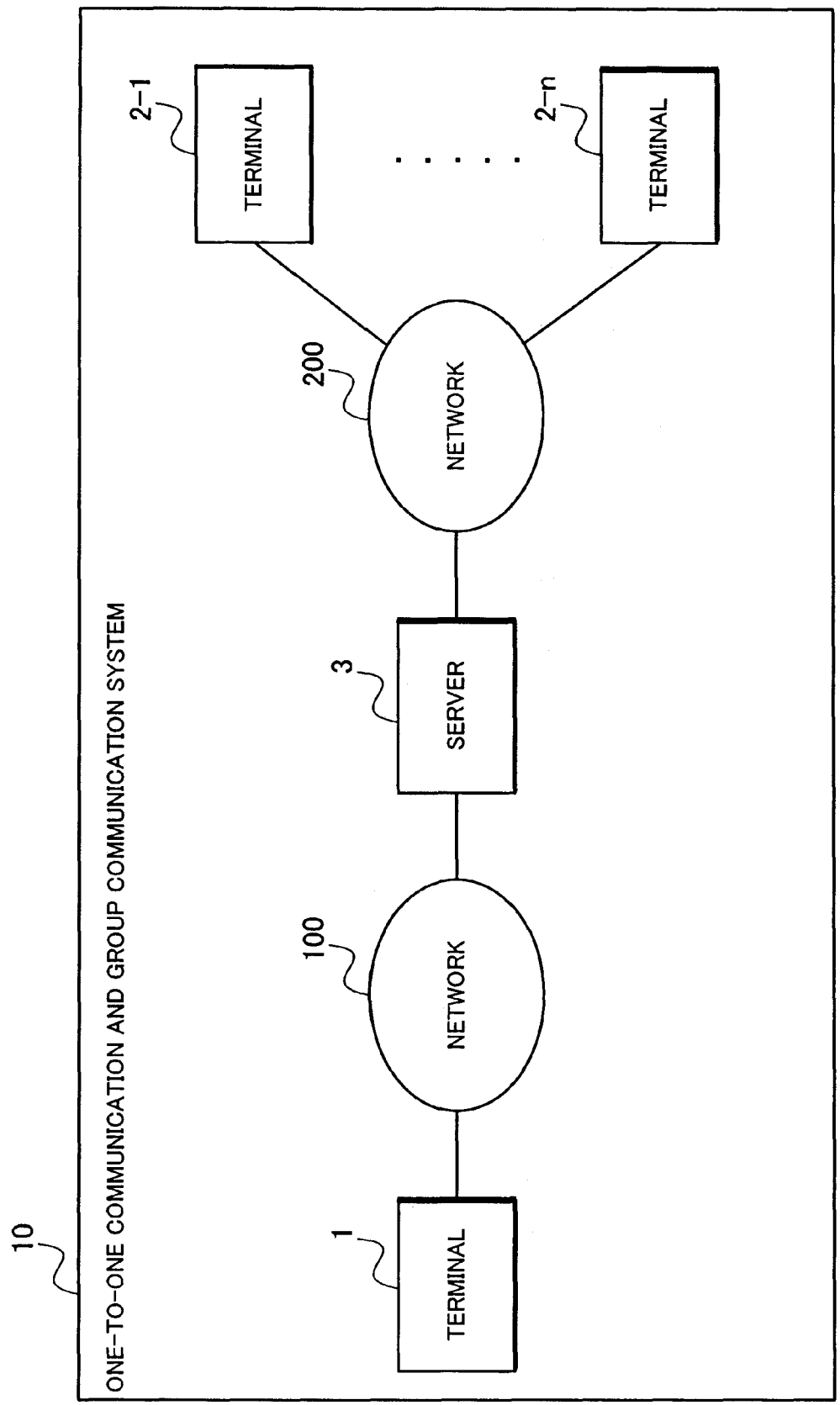
FIG. 1 is a block diagram showing the configuration of a communication system according to an exemplary embodiment of the present invention.

Next, exemplary embodiments according to the present invention will be described with reference to the drawings. FIG. 1 is a block diagram showing the configuration of a communication system according to a exemplary embodiment of the present invention. An example of communication system for one-to-one communication and group communication in an exemplary embodiment of the present invention is described in FIG. 1.

A one-to-one communication and group communication system 10 comprises terminals 1 and 2-1 to 2-*n* for sending and receiving data, a server 3 for delivering data sent by any among the terminals 1 and 2-1 to 2-*n* to a communication partner terminal or to a terminal belonging to a group in the case of group communication, and networks 100 and 200 for connecting the terminals 1 and 2-1 to 2-*n* with the server 3. The networks 100 and 200 may be the same network or different networks, and the present invention is not limited thereto.

Providing the terminals 1 and 2-1 to 2-*n* with terminal operation modification unit which refers to the state information (hereinafter, referred to as presence information) of the terminals 1 and 2-1 to 2-*n* and of the user to modify the operation of the terminals 1 and 2-1 to 2-*n*, and data processing unit which processes data, to carry out modification of the operation of the terminals 1 and 2-1 to 2-*n* and data processing while referring to presence information, allows modification of the operation of the terminal, and on terminal communication data processing to be performed, and allows the server side load due to the data processing to be reduced.

In the communication system 10 of exemplary embodiment of present invention, providing presence linking unit for refers to presence server information available on the server 3, and, based on the information, registering a new group with the group management server to create, based on the presence information, a new communication group allows a communication delivery group to be created automatically using the presence information.

In addition, in the communication system 10 of the exemplary embodiment of the present invention, providing unit which downloads programs, unit which holds the programs, and unit which executs the programs on the terminals 1 and 2-1 to 2-*n*, and providing a program download server on the server 3 to download and execute a program that provides a function lacking on the terminals 1 and 2-1 to 2-*n* to be realized by software download, enhancing the functions of the terminals 1 and 2-1 to 2-*n*.

First Exemplary Embodiment

Figure 2:
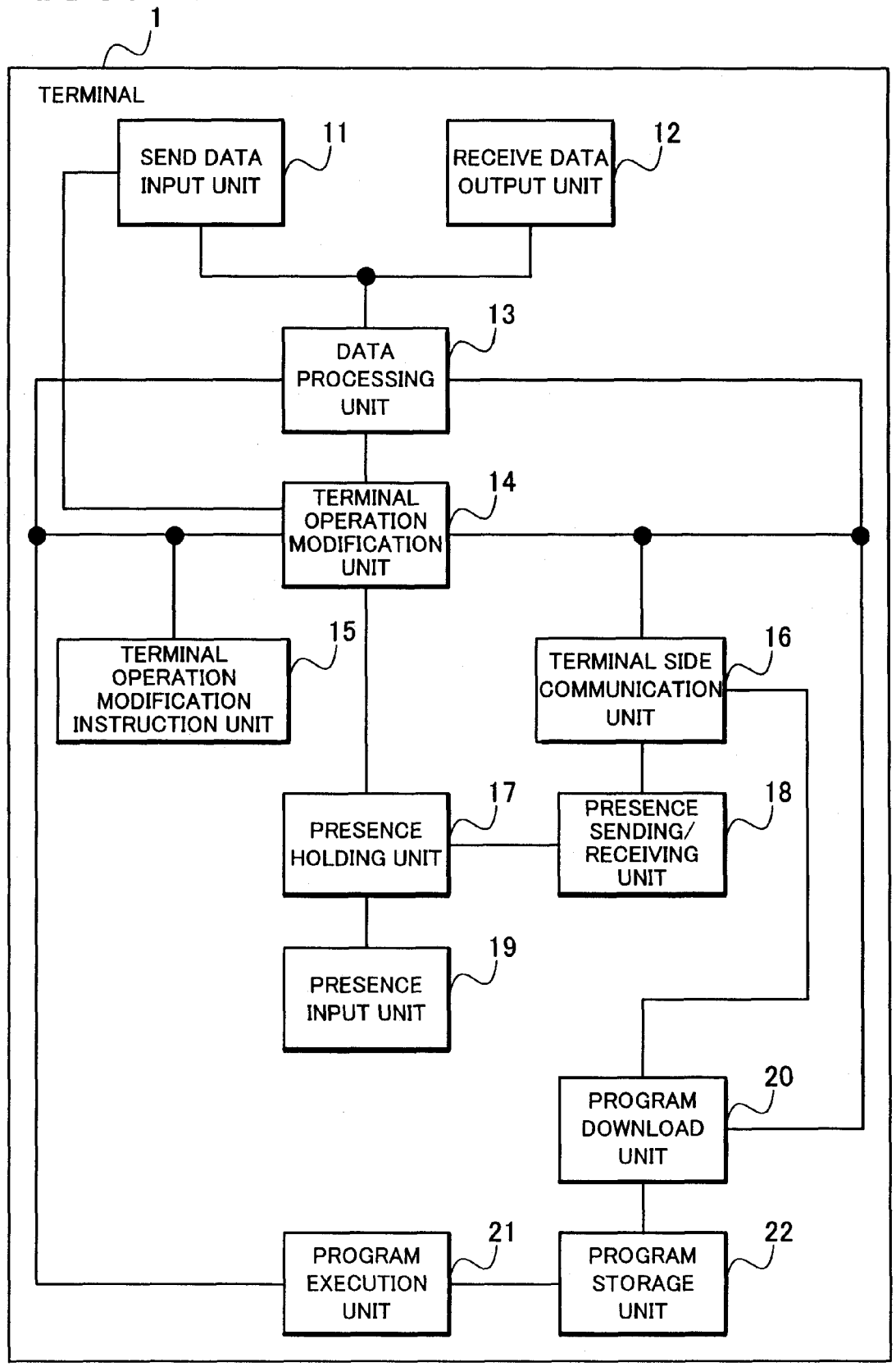
FIG. 2 is a block diagram showing the configuration of a terminal according to a first exemplary embodiment of the present invention.
Figure 3:
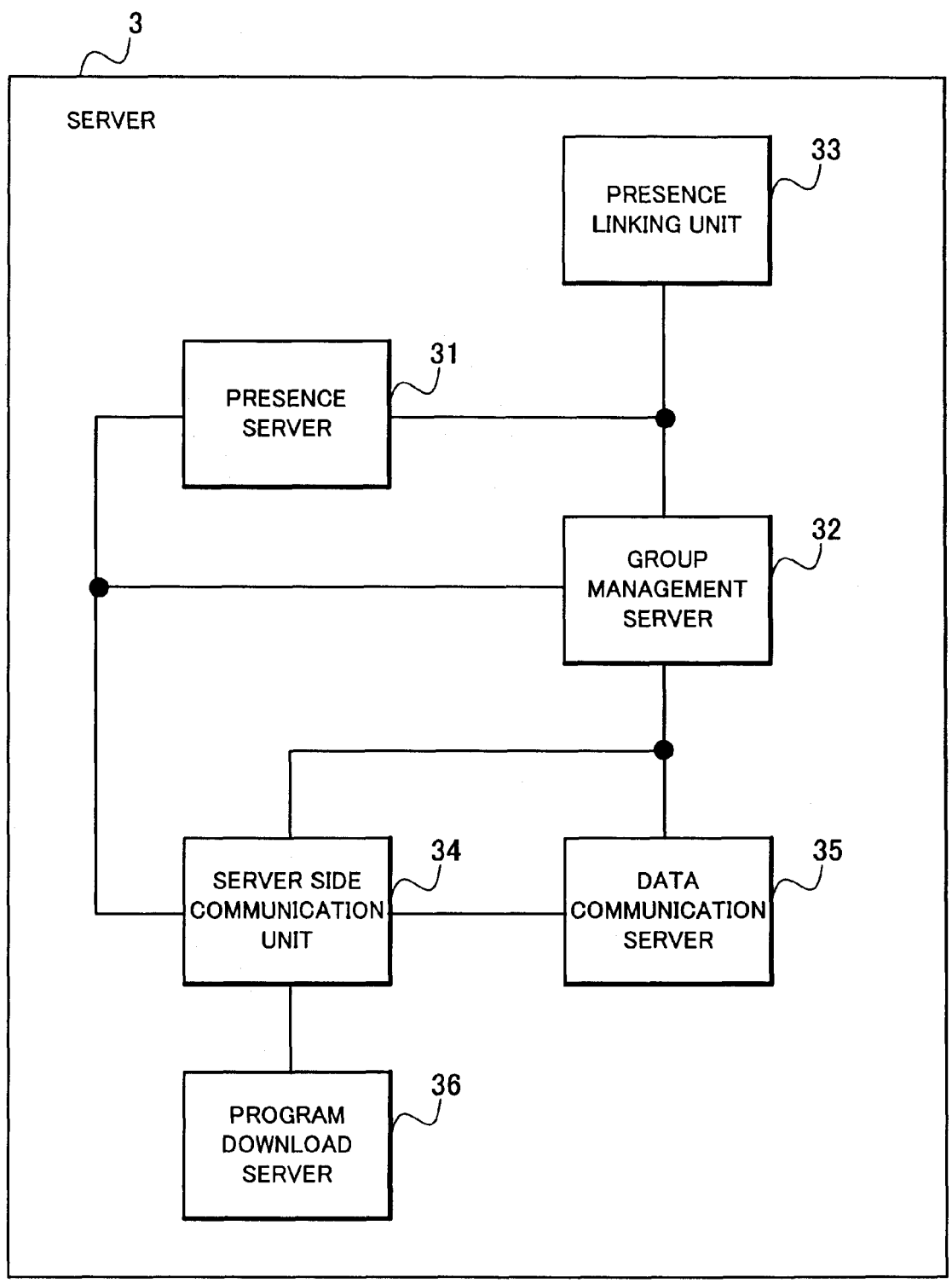
FIG. 3 is a block diagram showing the configuration of a server according to the first exemplary embodiment of the present invention.

Next, a first exemplary embodiment of the present invention will be described with reference to the drawings. FIG. 2 is a block diagram showing the configuration of the terminal according to a first exemplary embodiment of the present invention, and FIG. 3 is a block diagram showing the configuration of the server according to the first exemplary embodiment of the present invention. The terminal and server adopt the same topology as that of the communication system according to the exemplary embodiment of the present invention shown in FIG. 1, described above.

In FIG. 2, the terminal 1 comprises send data input unit 11, receive data output unit 12, data processing unit 13, terminal operation modification unit 14, terminal operation modification instruction unit 15, terminal side communication unit 16, presence holding unit 17, presence sending/receiving unit 18, presence input unit 19, program download unit 20, program execution unit 21 and program storage unit 22. Note that the terminals 2-1 to 2-*n* in FIG. 1 have the same configuration and operation as those of the above terminal 1.

The send data input unit 11 is a device for entering data to be sent to another terminal (e.g. a microphone for putting voice in). The receive data output unit 12 is a device for putting out the data received from another terminal (e.g. speaker for putting received voice data out).

The data processing unit 13 processes data to be sent/received, and the terminal operation modification unit 14 refers to presence information to modify the operation of the terminals 1 and 2-1 to 2-*n*. The terminal operation modification instruction unit 15 provides to the terminal operation modification unit 14 an instruction of the condition under which the operation is modified and the method for modifying the operation.

The terminal side communication unit 16 performs communication between the terminal 1 and the server 3. The presence input unit 19 enters presence information into the presence holding unit 17. The presence holding unit 17 keeps the presence information entered by the presence input unit 19.

The presence sending/receiving unit 18 selects, among the information held by the presence holding unit 17, presence information to notify the server 3 with, and sends/receives the presence information to/from the sever 3.

The program download unit 20 downloads software according to the instruction from the data processing unit 13 and the terminal operation modification unit 14. The program storage unit 22 stores the downloaded program, and the program execution unit 21 executes the program stored in the program storage unit 22.

In FIG. 3, the server 3 comprises a presence server 31, a group management server 32, a presence linking unit 33, a server side communication unit 34, a data communication server 35 and a download server 36.

The presence server 31 manages the presence information sent from each terminal 1 and 2-1 to 2-n. The group management server 32 manages the group of terminals 1 and 2-1 to 2-n, which perform communication. The presence linking unit 33 links the presence information and the group.

The server side communication unit 34 performs communication with the terminals 1 and 2-1 to 2-n. The data communication server 35 sends the communication data received from the terminals 1 and 2-1 to 2-n to the send destination terminal. The download server 36 downloads a program to the terminals 1 and 2-1 to 2-n according to requests from the terminals 1 and 2-1 to 2-n.

In the communication system according to the present exemplary embodiment, the network (networks 100 and 200 in FIG. 1) connecting the terminals 1 and 2-1 to 2-n with the server 3 represents a function for carrying communication data between the terminals 1 and 2-1 to 2-n and the server 3, and may be hard-wired or wireless.

Next, the operation of the communication system according to the first exemplary embodiment of the present invention will be described with reference to FIGS. 1 to 3. Although the terminal 1 and the server 3 will be described in the following description, it is assumed that the terminals 2-1 to 2-n can also operate similarly to the terminal 1.

The send data input unit 11 obtains the data to be sent to the communication partner terminal from the device of the terminal (not shown) and, while passing the data type to the terminal operation modification unit 14, performs passing of the send data to the data processing unit 13. For example, when performing voice communication, the send data input unit 11 handles the data from a microphone (not shown), and, in the case of picture communication or motion picture communication, it handles data from a camera (not shown).

The receive data output unit 12 receives the result of processing of the data received from the communication partner terminal by the data processing unit 13, and outputs the result to the device of the terminal (not shown). For example, in voice communication, the receive data output unit 12 performs the process of replaying the received data through a speaker (not shown), and, in the case of picture communication or motion picture communication, it replays the picture or motion picture on a display (not shown).

As the operation during receiving, the data processing unit 13 receives from the terminal operation modification unit 14, data from the communication partner terminal received via the server 3, while receiving instructions on whether or not the received data should be processed, and the data processing method. For example, if instructed by the terminal operation modification unit 14 to convert the voice into text, the process of converting the voice data received together from the communication partner into text, and passing the text to the receive data output unit 12, is performed. However, data processing is not performed if the instructions received from the terminal operation modification unit 14 say that data processing during receiving is unnecessary.

As the operation during sending, the data processing unit 13 receives send data from the send data input unit 11 while receiving from the terminal operation modification unit 14, instructions on whether or not the send data should be processed, and the data processing method. For example, if instructed by the terminal operation modification unit 14 to convert the voice into text, the process of converting the received voice data into text and passing the text to the terminal operation modification unit 14 is performed. However, data processing is not performed if the instructions received from the terminal operation modification unit 14 say that processing is unnecessary.

If the data processing unit 13 receives the instruction to process the data from the terminal operation modification unit 14, but does not have the function for processing the data according the instruction, a request for downloading a program to perform the instructed data processing is sent to the program download unit 20.

When the program download unit 20 finishes downloading the program, the program execution unit 21 runs the downloaded program to perform the desired data processing. For example, if the data processing unit 13 does not have a function for converting voice into text, a program to convert voice into text is obtained through download to perform the desired processing.

The terminal operation modification unit 14 refers to the presence information stored in the presence holding unit 17 according to the instruction from the terminal operation modification instruction unit 15, and performs the process of transmitting the instructions on whether or not the data should be processed and the data processing method to the data processing unit 13.

As the operation during receiving, in addition to those above, the terminal operation modification unit 14 determines the type of the receive data (e.g. voice, image and text) and after considering the information, sends the instruction to the data processing unit 13 while passing the receive data to the data processing unit 13.

As the operation during sending, the terminal operation modification unit 14 transmits the instructions on whether or not the send data should be processed and the data processing method to the data processing unit 13 after referring to the presence information stored in the presence holding unit 17 and the data type received from the send data input unit 11 according to the instruction from the terminal operation modification instruction unit 15, and receives the send data from the data processing unit 13 while passing the data to the terminal side communication unit. Note that it is also possible that the instruction to the data processing unit 13 is not performed every time data is send/received, but issued only when a change in the condition of the instruction has occurred.

If the terminal operation modification unit 14 does not have a function required to perform required processing, a request for downloading a program required for processing is sent to the program download unit 20. When the program download unit 20 finishes downloading the program, the program execution unit 21 runs the downloaded program to perform the desired processing. For example, if a function for determining the type of received data is lacking, a program for data determination is downloaded to perform the determination.

The terminal operation modification instruction unit 15 receives from the input means (not shown) of the terminal, instructions on the conditions whereunder to perform operation modification and the data processing method, and passes the input information to the terminal operation modification unit 14. Key entry by the user of the terminal, menu selection, a condition file which is entered in advance, or the like, are considered as input means (not shown).

The presence holding unit 17 has a function for holding the state of its terminal and the state of the user (presence information), which have been passed from the presence input unit 19. One or more types of presence information can be held, such as presence about the state of the terminal, presence about the state of the user, information on a peripheral device connected to the terminal.

The presence input unit 19 has a function for passing the presence information received from the input means (not shown) to the presence holding unit 17. The presence sending/receiving unit 18 has a function for sending the presence information to the presence server 31 when the information within the presence holding unit 17 is updated and should be sent to the presence server, and a function for storing the presence information from the presence server 31 in the presence holding unit 17. Communication of the presence information between the presence server 31 and the presence sending/receiving unit 18 is carried out through the terminal side communication function 16.

The program download unit 20 receives requests from the data processing unit 13 and the terminal operation modification unit 14, and downloads from the program download server 36, a program that meets the requests. Sending of the information on the program to be downloaded and downloading of the program are carried out via the terminal side communication function 16. The downloaded program is passed to the program storage unit 22.

The program storage unit 22 has a function for storing the program downloaded by the program download unit 20. The program execution unit 21 has a function for obtaining the program from the program storage unit 22 and executing the program. The information on the program to be executed is indicated by the data processing unit 13 and the terminal operation modification unit 14.

The terminal side communication unit 16 performs communication with the server 3 through the network 100. The communication method between the terminal 1 and the server 3 may use hardwiring, wireless, or both methods. During receiving, the terminal side communication unit 16 determines whether the received data is communication data, presence information, or a program, and, for communication data, passes the data to the terminal operation modification unit 14, for presence information, passes the information to the presence sending/receiving unit 18, and, for program, passes the program to the program download unit 20.

The presence server 31 holds the presence information sent from the terminals 1 and 2-1 to 2-n, while carrying out the process of sending the presence information to be sent to each terminal 1 and 2-1 to 2-n. The presence information is sent to/received from the terminals 1 and 2-1 to 2-n through the server side communication function 34.

The group management server 32 manages the members of the group (terminals belonging to the group) when group communication is performed among a plurality of terminals 1 and 2-1 to 2-n. The group management server 32 can manage a plurality of groups. The group management server 32 has also functions for adding a new group, removing an existing group and changing members belonging to the group.

The presence linking unit 33 holds a group creation rule instructed by the input means (not shown), and refers to the presence information managed by the presence server 31 to extract the terminal information suited to the rule. The presence linking unit 33 creates a new group information from the extracted terminal information and registers a new group with the group management server 32. A group creation rule, for example, specifies the terminals within a specific area, in which case a group is created by the terminals in the specified area, enabling communication among the terminals within the group.

The data communication server 35 has a function for receiving the data from the sending side terminal, and sending the data to the receiving side terminal. The data communication server 35 supports one-to-one communication and group communication, and, in the case of one-to-one communication, sends the data from the sending side terminal to the receiving side terminal. In the case of group communication, the data communication server 35 obtains from the group management server 32 information on the terminals belonging to the group, and sends the data from the sending side terminal to the other terminals belonging to the group. The data is sent to/received from the terminals through the server side communication unit 34.

The server side communication unit 34 is a function for receiving data from the terminals 1 and 2-1 to 2-n and sending data to the terminals 1 and 2-1 to 2-n. During receiving, the server side communication unit 34 determines whether the received data is communication data, presence information, or a request for downloading a program, and, for communication data, passes the data to the data communication server 35, for presence information, passes the information to the presence server 31, and, for a request for downloading a program, passes the request to the program download server 36.

Figure 4:
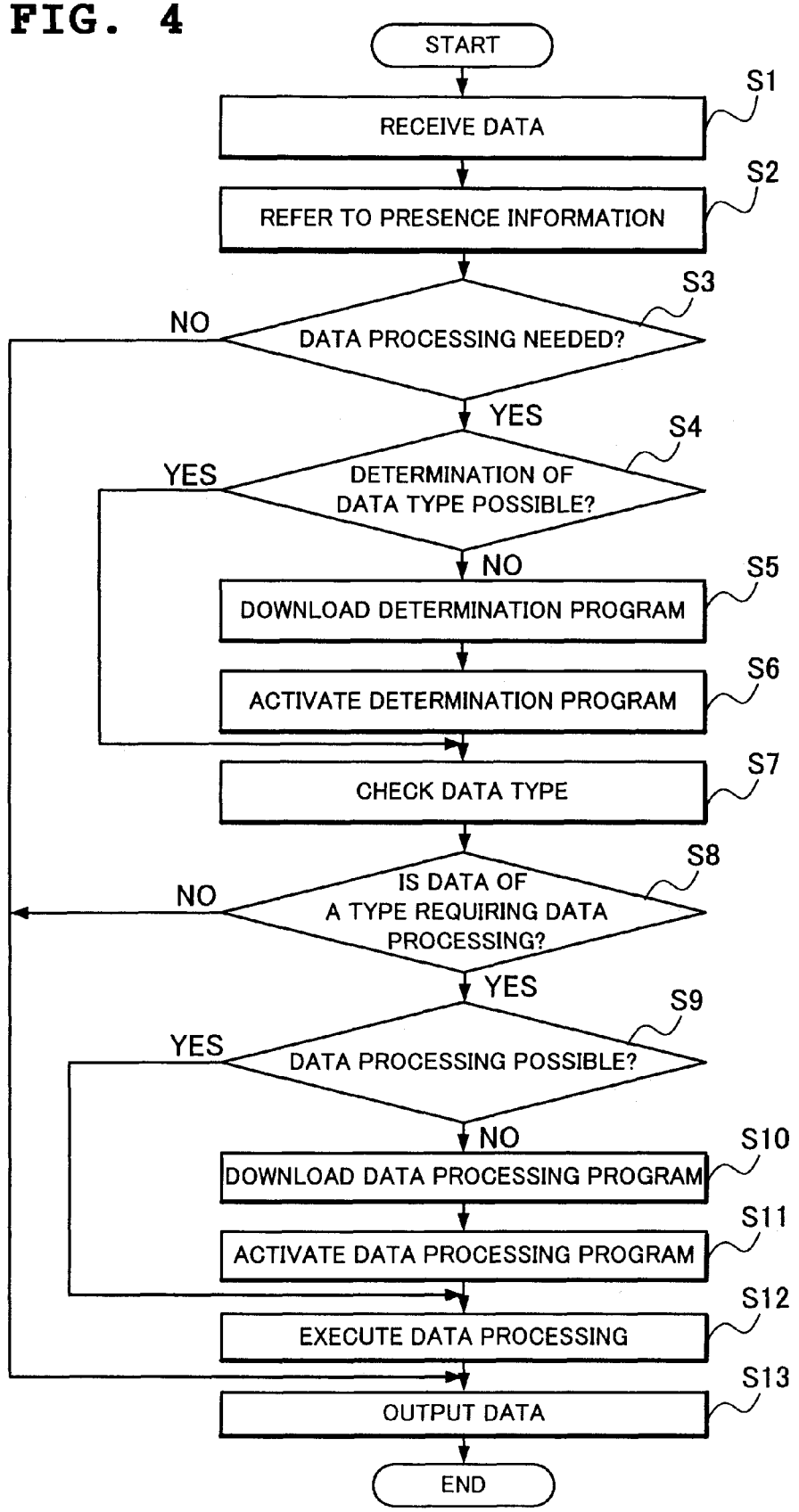
FIG. 4 is a flowchart showing the operation during data reception in the terminal in FIG. 1.

FIG. 4 is a flowchart showing the operation during data reception in the terminal 1 in FIG. 1. The operation whereby the terminal 1 receives data will be described with reference to FIGS. 1 to 4. The processing shown in FIG. 4 is achieved by executing the program in the program storage unit 22 with a central processing unit (CPU) (not shown) of the terminal 1. The CPU and the program execution unit 21 may be identical.

The terminal 1 receives with the terminal side communication unit 16 data sent from another terminal through the server 3 (Step S1 in FIG. 4), and with the terminal operation modification unit 14 refers to the presence information held by the presence holding unit 17 (Step S2 in FIG. 4) to determine whether or not the state requires data processing based on the referred presence information (Step S3 in FIG. 4), and, if not a state requiring data processing, proceeds to Step S13, and if a state requiring data processing, proceeds to Step S4.

The terminal operation modification unit 14 determines whether or not the type of the received data can be determined (Step S4 in FIG. 4), and, if the determination is possible, proceeds to Step S7, on the other hand, if the determination is impossible, proceeds to Step S5. If the determination is impossible in the above determination, the termination operation modification unit 14 downloads a determination program that enables determination of the type of the data, by a call to the program download unit 20 (Step S5 in FIG. 4).

The program execution unit 21 starts execution of the program downloaded by the program download unit 20 (Step S6 in FIG. 4), and checks the type of the received data (Step S7 in FIG. 4). The termination operation modification unit 14 determines whether or not the receive data is of a type requiring processing based on the result of the checking of the type of the received data (Step S8 in FIG. 4), and, if processing is necessary, proceeds to Step S9, on the other hand, if processing is not necessary, proceeds to Step S13.

The data processing unit 13 determines whether or not the data processing instructed by the terminal operation modification unit 14 is possible (Step S9 in FIG. 4), and, if possible, proceeds to Step S12, on the other hand, if impossible, proceeds to Step S10. If the data processing is impossible, the data processing unit 13 downloads software that performs data processing by a call to the program download unit 20 (Step S10 in FIG. 4).

The program execution unit 21 starts execution of the program downloaded by the program download unit 20 (Step S11 in FIG. 4), and causes the data processing unit 13 to process the data (Step S12 in FIG. 4). The receive data output unit 12 outputs the receive data processed by the data processing unit 13 (Step S13 in FIG. 4).

In this manner, in the present exemplary embodiment, since whether or not the data processing is necessary is determined based on the presence information and the data type, and the data is processed when processing is needed, modification of the operation of the terminal and data processing are possible depending on presence.

In addition, in the present exemplary embodiment, if the terminal does not have a required function, the required function can be added to the terminals 1 and 2-1 to 2-n by downloading a program. Furthermore, in the present exemplary embodiment, since the data is processed on the side of the terminals 1 and 2-1 to 2-n, the load on the server 3 side due to data processing can be reduced.

Figure 5:
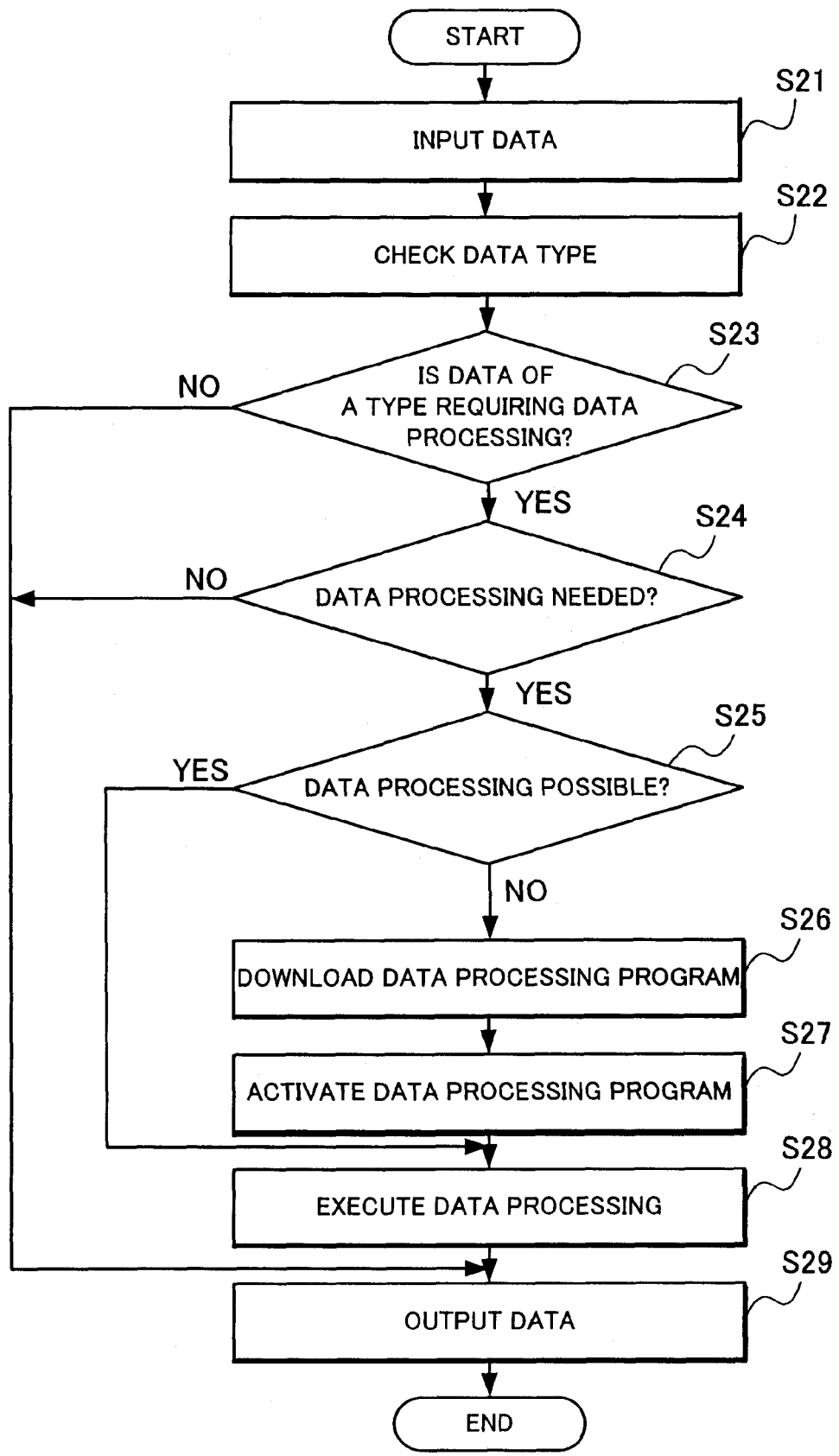
FIG. 5 is a flowchart showing the operation during data sending in the terminal in FIG. 1.

FIG. 5 is a flowchart showing the operation during data sending in the terminal 1 in FIG. 1. The operation whereby the terminal 1 sends data will be described with reference to FIGS. 1 to 3 and 5. The processing shown in FIG. 5 is achieved by executing the program in the program storage unit 22 with a CPU (not shown) of the terminal 1. The CPU and the program execution unit 21 may be identical.

The send data input unit 11 obtains input data, while notifying the terminal operation modification unit 14 of the type of the data (Step S21 in FIG. 5). The terminal operation modification unit 14 checks the type of the data from the send data input unit 11 (Step S22 in FIG. 5).

The terminal operation modification unit 14 determines whether or not the data is of a type requiring data processing (Step S23 in FIG. 5), and, if data processing is necessary, proceeds to Step S24, on the other hand, if data processing is not necessary, proceeds to Step S29.

The terminal operation modification unit 14 refers to presence information to determine whether or not the data should be processed (Step S24 in FIG. 5), and, if the processing is necessary, instructs the data processing unit 13 to process the data and proceeds to Step S25, on the other hand, if the processing is not necessary, proceeds to Step S29.

The data processing unit 13 determines whether or not the data processing instructed by the terminal operation modification unit 14 is possible (Step S25 in FIG. 5), and, if possible, proceeds to Step S28, on the other hand, if impossible, proceeds to Step S26.

If the data processing is impossible, the data processing unit 13 sends an instruction to download a program for processing the data to the program download unit 20, and the program download unit 20 downloads the program (Step S26 in FIG. 5).

The program execution unit 21 starts execution of the program downloaded by the program download unit 20 (Step S27 in FIG. 5). When the data processing unit 13 determines the data processing is possible, or the program execution unit 21 executes the program, the data processing unit 13 processes the data (Step S28 in FIG. 5). The data processed send data is sent out via the data send process by the terminal side communication unit 16 (Step S29 in FIG. 5).

In this manner, in the present exemplary embodiment, since whether or not the data processing is necessary is determined based on the presence information and the data type, and the data is processed when processing is needed, modification of the operation of the terminal and data processing are possible depending on presence. In addition, in the present exemplary embodiment, if the terminals 1 and 2-1 to 2-n do not have a required function, the required function can be added to the terminals 1 and 2-1 to 2-n by downloading a program. Furthermore, in the present exemplary embodiment, since the data is processed on the side of the terminals 1 and 2-1 to 2-n, the load on the server 3 side due to data processing can be reduced.

Figure 6:
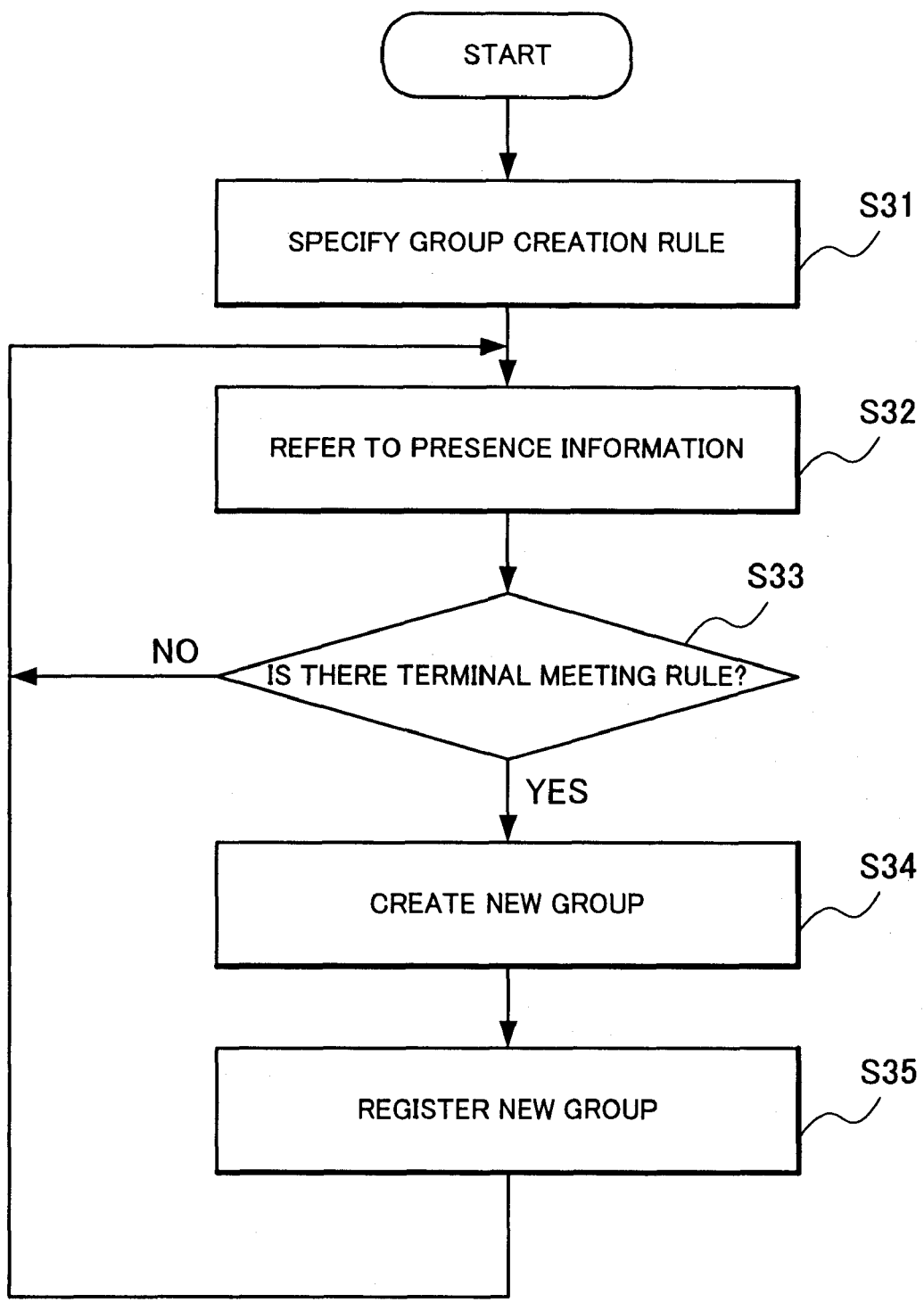
FIG. 6 is a flowchart showing the operation related to the automatic creation of a group that communicates in the communication system according to the first exemplary embodiment of the present invention.

FIG. 6 is a flowchart showing the operation related to the automatic creation of a group that communicates in the communication system according to the first exemplary embodiment of the present invention. The operation whereby the server 3 automatically creates a group will be described with reference to FIGS. 1 to 3 and 6. The processing shown in FIG. 6 is achieved by executing the program in the program storage means (not shown) with a CPU (not shown) of the server 3.

When a group creation rule is set by input means (not shown) (Step S31 in FIG. 6), the presence linking unit 33 refers to the presence information held by the presence server 31 (Step S32 in FIG. 6). It is assumed that the presence information has already been sent to the presence server 31 from the presence sending/receiving unit 18 in the terminals 1 and 2-1 to 2-n.

The presence linking unit 33 checks whether or not a terminal that meets the condition of the group creation rule exists, based on the referred presence information (Step S33 in FIG. 6), and, if there is a terminal that meets the rule, proceeds to Step S34 after collecting the information on all the terminals that meet the rule, on the other hand, if there is no applicable terminal, returns to Step S32.

The presence linking unit 33 creates a new group based on the collected terminal information (Step S34 in FIG. 6), registers the created new group with the group management server 32 (Step S35 in FIG. 6), and returns to Step S32.

In this manner, in the present exemplary embodiment, since a group creation rule is provided to the presence linking unit 33, and the presence information held by the presence server 31 is referred to detect terminals that meet the rule, and then a new group is registered with the group management server 32, a group of terminals having the same condition (e.g. terminals within a specific area) can be created automatically.

Second Exemplary Embodiment

Figure 7:
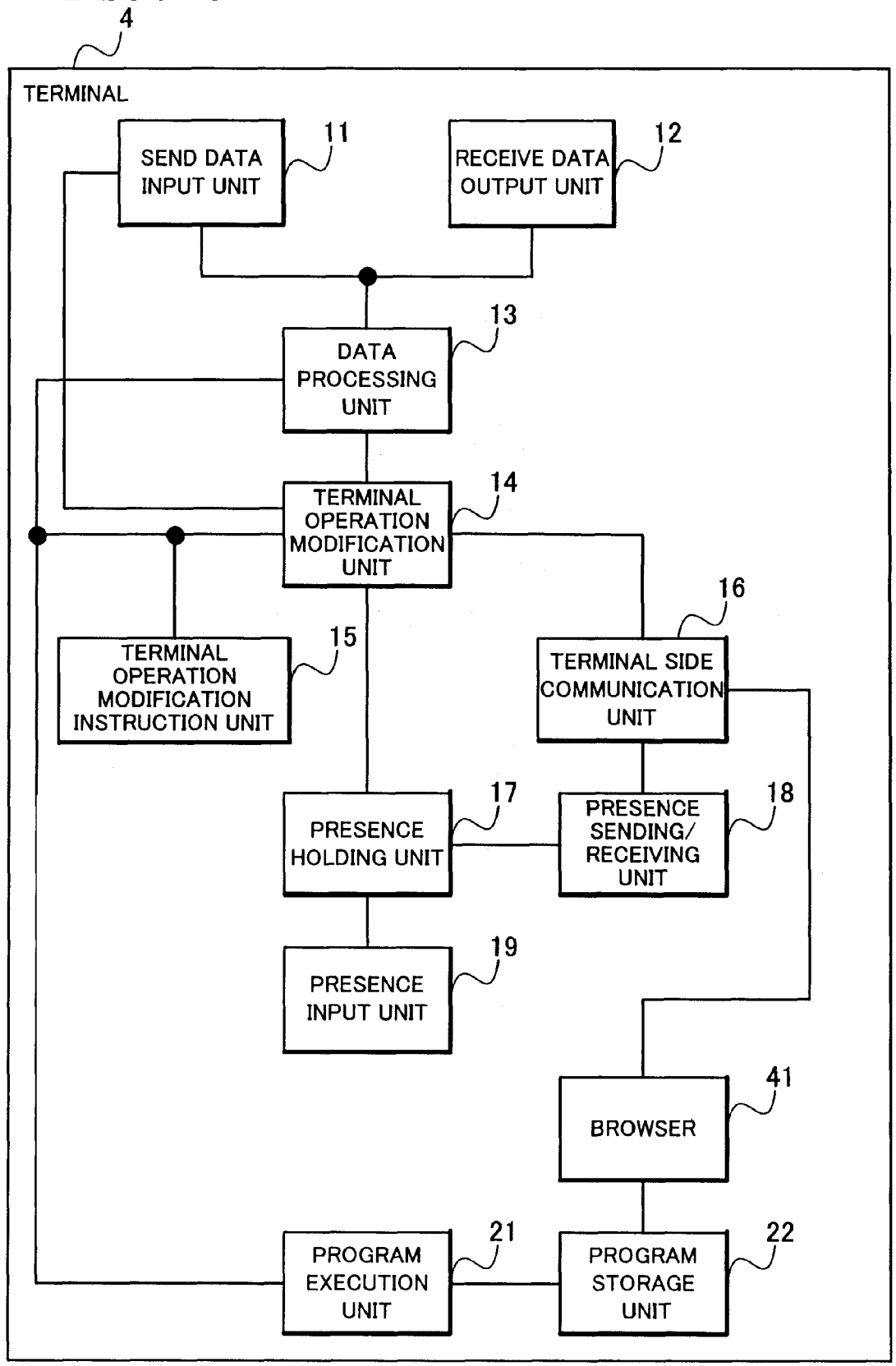
FIG. 7 is a block diagram showing the configuration of a terminal according to a second exemplary embodiment of the present invention.

FIG. 7 is a block diagram showing the configuration of a terminal according to a second exemplary embodiment of the present invention. In FIG. 7, the second exemplary embodiment of the present invention has the same configuration as that of the terminal 1 according to the first exemplary embodiment of the present invention shown in FIG. 2, except that a browser (or a mailer) 41 is provided as a program download unit 20, and like numerals are assigned to like components.

In the present exemplary embodiment, the effect of allowing a function to be added to the terminal 4 is obtained with the above configuration, by using beforehand the browser 41 to perform determination of the type of data and downloading of a program required for data processing. In the above configuration, the browser 41 may be configured with a function capable of communicating, such as Java™.

Third Exemplary Embodiment

Figure 8:
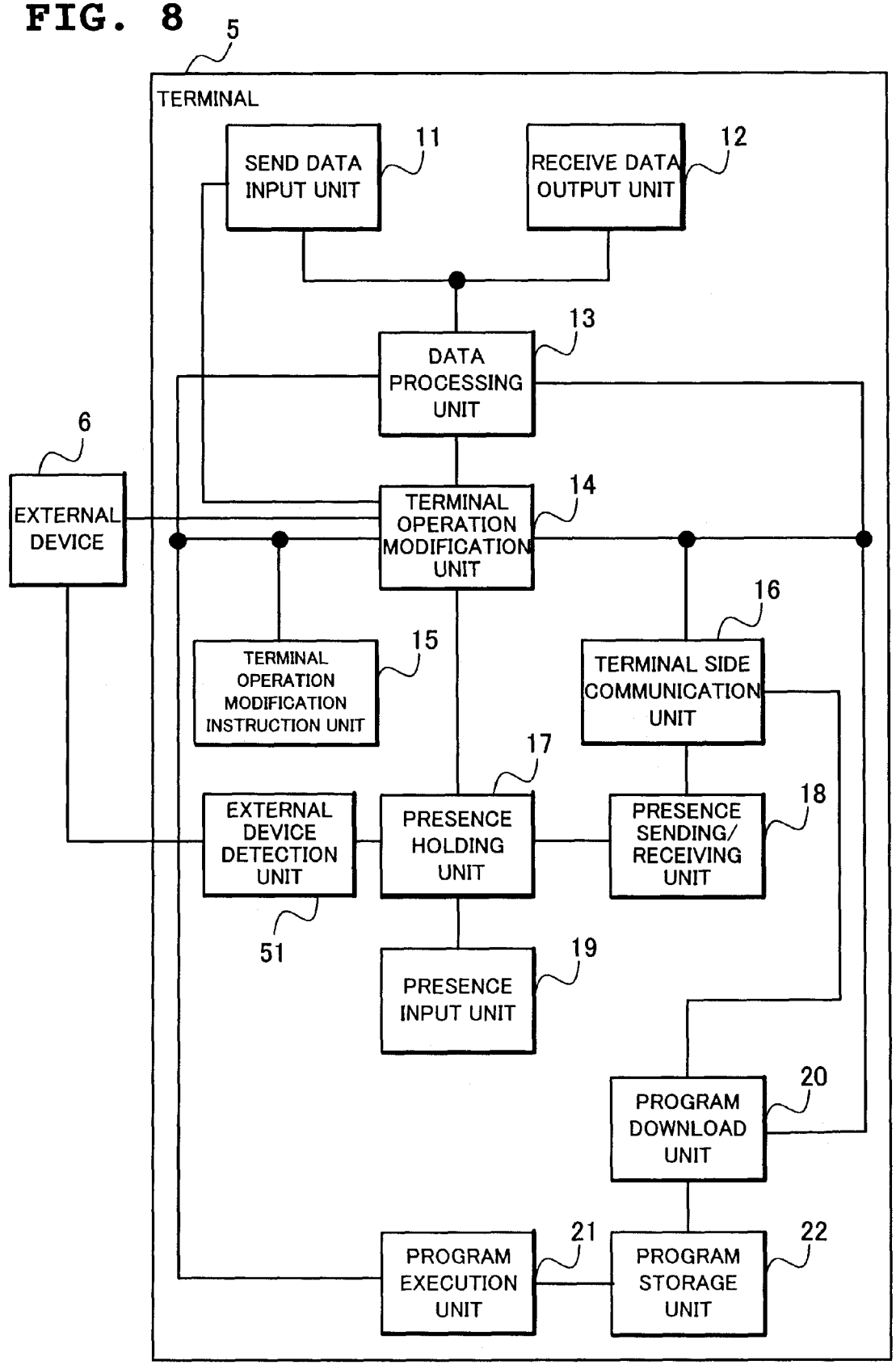
FIG. 8 is a block diagram showing the configuration of a terminal according to a third exemplary embodiment of the present invention.

FIG. 8 is a block diagram showing the configuration of a terminal according to a third exemplary embodiment of the present invention. In FIG. 8, the third exemplary embodiment of the present invention has the same configuration as that of the terminal 1 according to the first exemplary embodiment of the present invention shown in FIG. 2, except that an external device detection unit 51 for detecting an external device 6 connected to a terminal 5 is provided, and like numerals are assigned to like components.

In present exemplary embodiment, a configuration is shown, whereby receive data is output to the external device 6 connected to the terminal 5. Since portions corresponding to the networks 100 and 200, and the server 3 have the same configuration as that of the terminal 1 according to the first exemplary embodiment of the present invention shown in FIG. 2, the portions are not shown in FIG. 8.

The external terminal detection unit 51 detects that the external device 6 is connected, and registers with the presence holding unit 17 the information regarding the connected external device 6 (the type of the device).

The terminal operation modification unit 14 refers to the presence information held by the presence holding unit 17, and if there is presence information indicating that the external device 6 is connected, passes the receive data to the external device 6. Operations other than this operation are the same as those of the configuration of the terminal 1 according to the first exemplary embodiment of the present invention shown in FIG. 2.

In this manner, in the present exemplary embodiment, for example, when a large display is connected as the external device 6, by providing to the terminal operation modification unit 14 an instruction to send the receive data to the large display if there is a large display, the received image data can be displayed on the external device 6.

Fourth Exemplary Embodiment

Figure 9:
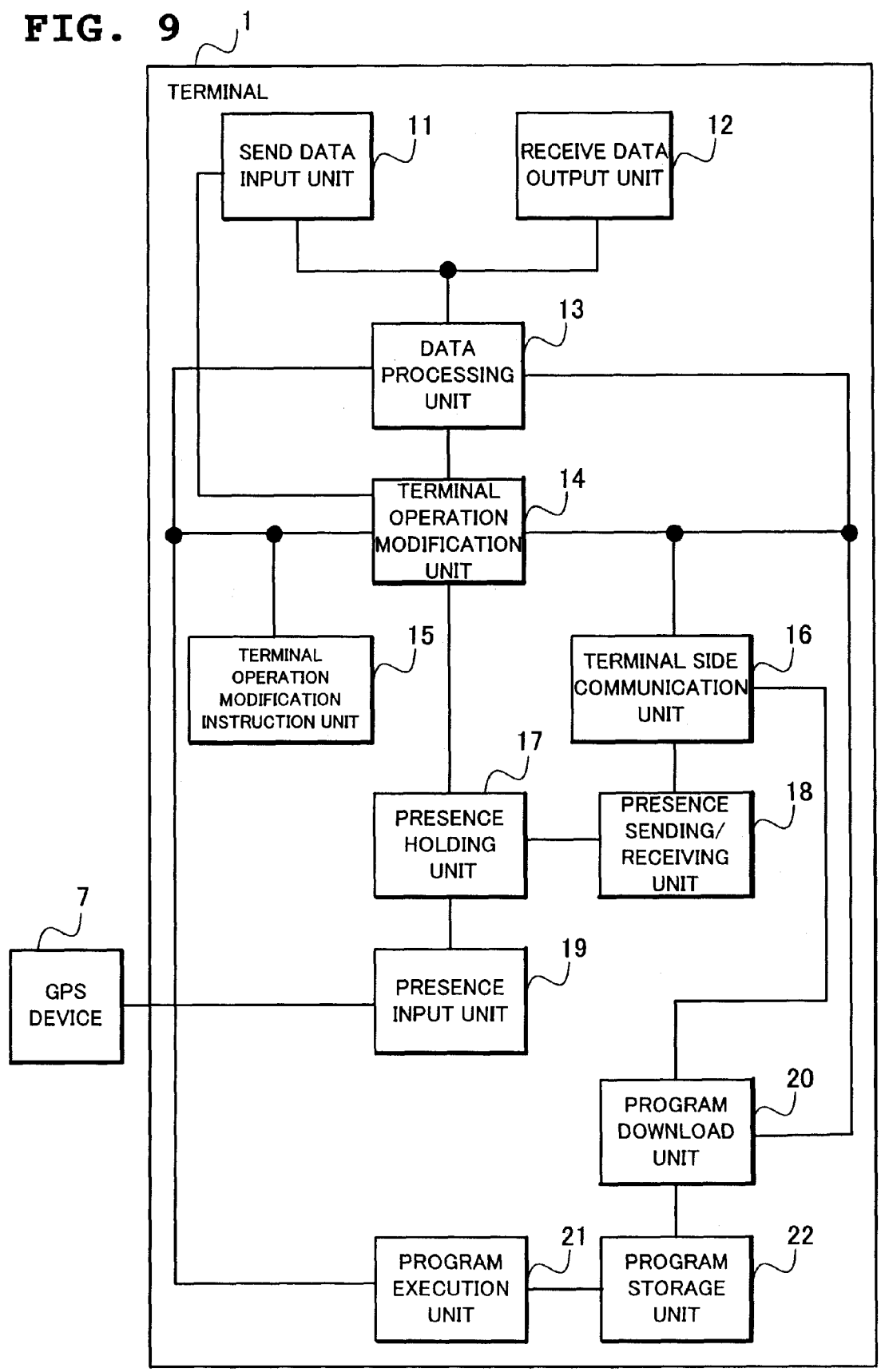
FIG. 9 is a block diagram showing the configuration of a terminal according to a fourth exemplary embodiment of the present invention.

FIG. 9 is a block diagram showing the configuration of a terminal according to a fourth exemplary embodiment of the present invention. In FIG. 9, the fourth exemplary embodiment of the present invention has the same configuration as that of the terminal 1 according to the first exemplary embodiment of the present invention shown in FIG. 2, except that a global positioning system (GPS) device 7 is connected to the terminal 1, and like numerals are assigned to like components.

In the present exemplary embodiment, a configuration is shown, whereby positional information from the GPS device 7 connected to the terminal 1 is registered as the presence information, and the presence information (positional information) is used to create a new communication group. Since portions corresponding to the networks 100 and 200, and the server 3 have the same configuration as that of the terminal 1 according to the first exemplary embodiment of the present invention shown in FIG. 2, the portions are not shown in FIG. 9.

The GPS device 7 sends the positional information to the presence input unit 19. The presence input unit 19 registers the positional information from the GPS device 7 with the presence holding unit 17. The presence holding unit 17 sends the newly registered presence information (positional information) through the presence sending/receiving unit 18, to the presence server 31 on the server 3.

In this manner, in the present exemplary embodiment, since the positional information from the GPS device 7 can be registered with the presence server 31 on the server 3, a new communication group comprising the terminals 1 within the same area can be generated on the server 3.

In the configuration, the GPS device 7 may be embedded within the terminal 1. Alternatively, in the configuration, another device may be connected instead of the GPS device 7 to handle data other than positional information as presence information, and use the presence information to generate a new group.

Fifth Exemplary Embodiment

Figure 10:
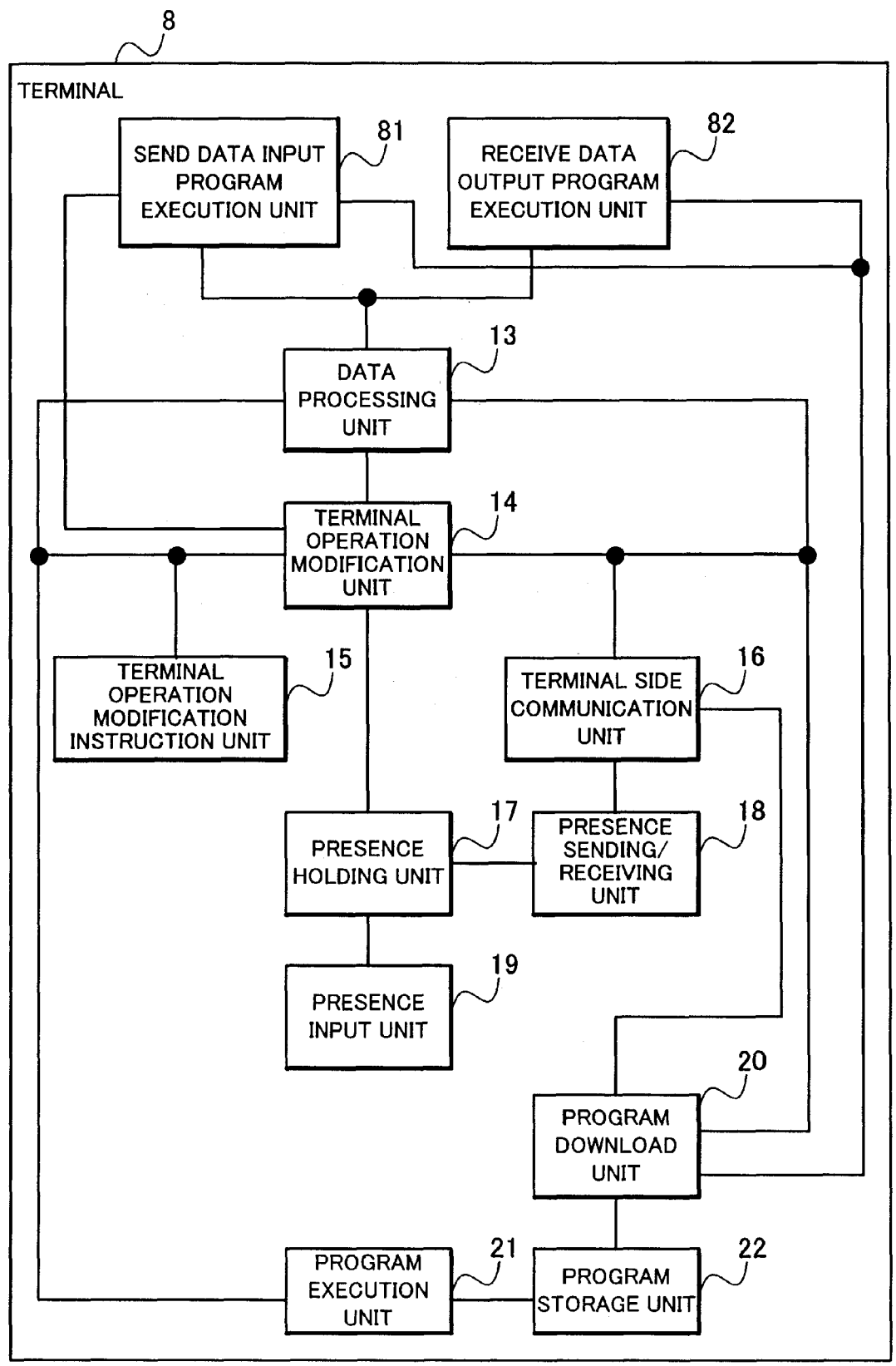
FIG. 10 is a block diagram showing the configuration of a terminal according to a fifth exemplary embodiment of the present invention.

FIG. 10 is a block diagram showing the configuration of a terminal according to a fifth exemplary embodiment of the present invention. In FIG. 10, the fifth exemplary embodiment of the present invention has the same configuration as that of the terminal 1 according to the first exemplary embodiment of the present invention shown in FIG. 2, except that a send data input program execution unit 81 and a receive data output program execution unit 82 are provided instead of the send data input unit 11 and the receive data output unit 12, and like numerals are assigned to like components. Since portions corresponding to the networks 100 and 200, and the server 3 have the same configuration as that of the terminal 1 according to the first exemplary embodiment of the present invention shown in FIG. 2, the portions are not shown in FIG. 10.

The send data input program execution unit 81 executes a program for inputting send data that has been downloaded using the program download unit 20. The receive data output program execution unit 82 executes a program for outputting receive data that has been downloaded using the program download unit 20.

In the present exemplary embodiment, since processing regarding input and output can be performed by the downloaded program, for instance, changes in the graphical user interface (GUI) related to the input and output of the terminal 8 and changes in the related menu function can be performed.

In the present exemplary embodiment, by replacing the data processing unit 13 with the data processing program execution unit, the terminal operation modification unit 14 with the terminal operation modification program execution unit, and the presence holding unit 17 with the presence holding program execution unit to achieve each function by the execution of downloaded programs, the contents of processing of each portions can be changed.

In this manner, in the present invention, the terminals 1, 2-1 to 2-n, 4, 5 and 8 refer to presence information, which represents the states of the terminals 1, 2-1 to 2-n, 4, 5 and 8 and the user, to add new functions for modifying the operation and performing data processing thereby setting the conditions whereunder a modification of the operation of the terminals 1, 2-1 to 2-n, 4, 5 and 8 and data processing are performed with respect to the terminals 1, 2-1 to 2-n, 4, 5 and 8, is sufficient to allow the specified operation to be performed when a condition is met. As a result, in the present invention, modification of the operation of the terminal and data processing can be performed automatically when a condition is met.

In the present invention, since the load due to data processing can be distributed over many terminals 1, 2-1 to 2-n, 4, 5 and 8 by performing the communication data processing among the terminals 1, 2-1 to 2-n, 4, 5 and 8 on the side of the terminals 1, 2-1 to 2-n, 4, 5 and 8, not on the side of the server 3, the load on the server 3 in the one-to-one communication and group communication system 10 can be reduced.

In the present invention, since the presence linking unit 33 for referring to the presence information to generate automatically a group comprising the terminals 1, 2-1 to 2-*n*, 4, 5 and 8 that meet the specified condition is newly added to the server 3, in the one-to-one communication and group communication system 10, the communication group of the terminals 1, 2-1 to 2-*n*, 4, 5 and 8 that meet the specified condition can be created automatically.

In the present invention, since software download function, program holding function, and program execution function are added to the terminals 1, 2-1 to 2-*n*, 4, 5 and 8, if a function is lacking in the terminals 1, 2-1 to 2-*n*, 4, 5 and 8, the missing function can be added.

In the present invention, since a function for holding the presence information in the terminals 1, 2-1 to 2-*n*, 4, 5 and 8 is added, it is possible to use only within the terminals 1, 2-1 to 2-*n*, 4, 5 and 8 state and information that are undesirable to notify the server 3 with, and to notify the server 3 of the presence information that may be disclosed only, therefore, more detailed presence information can be used in the terminals 1, 2-1 to 2-*n*, 4, 5 and 8 while giving weight to privacy.

Note that the present invention can be applied to a teleconferencing system comprising an external image display and an external microphone connected to the above described terminals 1 and 2-1 to 2-*n* of the one-to-one communication and group communication system 10.

In addition, the present invention can perform billing depending on the duration the number of times of utilization of the system by implementing in the server 3 in the above teleconferencing system a function for performing billing when a one-to-one communication or a group communication is made.

The present invention can be applied to a game system in which game program execution unit is implemented in the terminals 1 and 2-1 to 2-*n* in the above one-to-one communication and group communication system 10, a function for sending/receiving communication data of one-to-one communication and group communication is provided to the game program executed by the game execution unit, the type of the game program held by the terminals 1 and 2-1 to 2-*n* is held as presence information, the presence information is sent to the presence server 31 on the server 3, and a group comprising the terminals 1 and 2-1 to 2-*n* holding the same game programs is automatically created by the server 3 for the group to play the game.

In addition, the present invention can perform billing depending on the duration and the number of times of utilization of the game by implementing in the server 3 in the above game system a function for performing billing when the game is played.

The present invention can be applied to a communication system for assuring and checking the delivery of the communication data by applying the Transmission Control Protocol (TCP) protocol to sending and receiving of communication data between the terminals 1 and 2-1 to 2-*n* and the server 3 and between the server 3 and the communication partner terminal, of the above one-to-one communication and group communication system 10. In addition, the present exemplary embodiment can send/receive electronic cash between communication terminals by adding a function for managing electronic cash to the communication terminal of the above communication system, and sending the function held by the communication terminal to another terminal.

Additionally, the present invention can perform billing depending on the number of times and the amount of electronic cash sending/receiving, by implementing in the server of the system that sends/receives the electronic cash, described above, a function for performing billing when sending/receiving electronic cash.

In the communication system of the present invention, with the configuration and operation as described above, the effect of allowing modification of terminal operation and on terminal communication data processing to be performed is obtained.

In another communication system of the present invention, with the configuration and operation as described above, the effect of allowing the load on the server side due to data processing to be reduced is obtained.

In addition, in another communication system of the present invention, with the configuration and operation as described above, the effect of allowing the presence information to be used to create automatically a communication delivery destination group is obtained.

Moreover, in another communication system of the present invention, with the configuration and operation as described above, the effect of allowing a function lacking on the terminal to be achieved by downloading software, enhancing the function of the terminal, is obtained.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied to applications such as one-to-one communication and group communication system, and mobile terminal for using the service. In addition, the present invention can be applied to an application such as a program on the PC (personal computer) that uses a one-to-one communication and group communication service.

The invention claimed is:

1. A communication system in which a server receives data from a communication terminal on the sending side through a network, and delivers the data to a communication terminal on the receiving side through said network,
   wherein said communication terminal comprises:
      a holding unit which holds presence information representing state information regarding various states of said communication terminal and a user; and
      a unit which modifies the operation of said communication terminal and performs send/receive data processing based on the presence information held in said holding unit.

2. The communication system according to claim 1, wherein said communication terminal comprises a sending unit which sends to said server presence information held in said holding unit, and
   wherein said server comprises a linking unit which uses the presence information from said communication terminal to create a group of communication terminals that perform communication.

3. The communication system according to claim 1 or claim 2, wherein said communication terminal comprises:
   a download unit which downloads from said server a program for performing modification of the operation of said communication terminal and send/receive data processing and an execution unit which executes the program downloaded from said server by said download unit.

4. The communication system according to claim 3, wherein said download unit is a browser for browsing contents on the Internet.

5. The communication system according to claim 3, wherein a user interface of said communication terminal is realized by executing the program downloaded by said download unit.

6. The communication system according claim 1, wherein said communication terminal comprises:
- a detection unit which detects an external device connected to the terminal;
- a unit which outputs receive data to the external device detected by said detection unit; and
- a unit which sends the data from the external device detected by said detection unit.

7. The communication system according to claim 6, wherein said communication terminal handles the information from the external device detected by said detection unit as the presence information within said terminal.

8. The communication system according to claim 6, wherein said communication terminal downloads a driver program for performing a linking operation to the external device detected by said detection unit.

9. The communication system according to claim 1, wherein said communication terminal limits the type of the presence information sent to said server, among the presence information held in said holding unit.

10. The communication system according to claim 1, wherein an external image display and an external microphone are connected to said communication terminal, and said communication terminal is used to construct a teleconferencing system.

11. The communication system according to claim 10, wherein said server comprises a unit which performs billing depending on the duration and the number of times of utilization in said teleconferencing system.

12. The communication system according to claim 1, wherein said communication terminal comprises:
- a game program execution unit which executes a game program; and
- a unit which sends/receives communication data to/from the game program executed by said game execution unit, the type of the game program executed by said game execution unit being held in said holding unit as presence information, and the presence information being sent to said server, and
- wherein said server creates a group of communication terminals including the same game program based on said presence information.

13. The communication system according to claim 12, wherein said server comprises a unit which performs billing depending on the duration and the number of times of utilization of the game when said game program is executed.

14. The communication system according to claim 1, wherein a Transmission Control Protocol (TCP) is applied for sending/receiving communication data between said server and said communication terminal.

15. The communication system according to claim 14, wherein said communication terminal comprises a management unit which manages electronic cash, and the electronic cash managed by said management unit is sent to/received from another communication terminal.

16. The communication system according to claim 15, wherein said server comprises a unit which performs billing depending on the number of times and the amount of sending/receiving said electronic cash when said electronic cash is sent/received.

17. The communication system according to claim 1, used for one-to-one communication and group communication in said communication terminal.

18. The communication system according to claim 1, wherein said communication terminal comprises a modification instruction unit which specifies a specific condition whereunder modification of operation of said communication terminal is performed, and the method for modifying the operation of said communication terminal.

19. The communication system according to claim 1, wherein the various states comprise more than two different states of said communication terminal and said user.

20. A communication terminal for receiving data from a sending side through a server and a network, and sending the data to a receiving side through said server and said network, the communication terminal comprising:
- a holding unit which holds presence information representing state information regarding various states of the terminal and a user; and
- a unit which modifies the operation of said terminal and performs send/receive data processing based on the presence information held in said holding unit.

21. The communication terminal according to claim 20 comprising a sending unit which sends presence information held in said holding unit to said server to cause the presence information to be used to create in said server a group of communicating terminals.

22. The communication terminal according to claim 20, comprising:
- a download unit which downloads from said server a program for performing modification of the operation of the terminal and send/receive data processing; and
- an execution unit which executes the program downloaded from said server by said download unit.

23. The communication terminal according to claim 22, wherein said download unit is a browser for browsing contents on the Internet.

24. The communication terminal according to claim 22, wherein a user interface is realized by executing the program downloaded by said download unit.

25. The communication terminal according to claim 20, comprising:
- a detection unit which detects an external device connected to the terminal;
- a unit which outputs receive data to the external device detected by said detection unit; and
- a unit which sends the data from the external device detected by said detection unit.

26. The communication terminal according to claim 25, which handles the information from the external device detected by said detection unit as the presence information within the terminal.

27. The communication terminal according to claim 25, which downloads a driver program for performing a linking operation to the external device detected by said detection unit.

28. The communication terminal according to claim 20, which limits the type of the presence information sent to said server, among the presence information held in said holding unit.

29. The communication terminal according to claim 20, wherein an external image display and an external microphone are connected to the terminal, and the terminal is used to construct a teleconferencing system.

30. The communication terminal according to claim 20 comprising:
   a game program execution unit which executes a game program; and
   a unit which sends/receives communication data to/from the game program executed by said game execution unit, the type of the game program executed by said game execution unit being held in said holding unit as presence information, and the presence information being sent to said server, and
   wherein, based on said presence information, a group of communication terminals including the same game program is created in said server.

31. The communication terminal according to claim 20, wherein a Transmission Control Protocol (TCP) is applied for sending/receiving communication data between said server and the terminal.

32. The communication terminal according to claim 31, comprising a management unit which manages electronic cash, the electronic cash managed by said management unit being sent to/received from another device.

33. The communication terminal according to claim 20, used for one-to-one communication and group communication in said communication terminal.

34. The communication terminal according to claim 20, wherein said communication terminal comprises a modification instruction unit which specifies a specific condition whereunder modification of operation of said communication terminal is performed, and the method for modifying the operation of said communication terminal.

35. A communication method used in a communication system in which a server receives data from a communication terminal on the sending side through a network, and delivers the data to a communication terminal on the receiving side through said network, the communication method comprising said communication terminal performing the steps of:
   holding presence information representing state information regarding various states of said communication terminal and a user in holding unit; and
   modifying the operation of said communication terminal and performing send/receive data processing based on the presence information held in said holding.

36. The communication method according to claim 35, wherein said communication terminal sends to said server presence information held in said holding unit, and
   said server uses the presence information from said communication terminal to create a group of terminals that perform communication.

37. The communication method according to claim 35, wherein said communication terminal performs the steps of:
   downloading from said server a program for performing modification of the operation of said communication terminal and send/receive data processing; and
   executing the program downloaded from said server.

38. The communication method according to claim 37, wherein the step of downloading said program is to use a browser for browsing the contents on the Internet to download said program.

39. The communication method according to claim 37, wherein a user interface of said communication terminal is realized by executing the program downloaded by the step of downloading said program.

40. The communication method according to claim 35, comprising said communication terminal performing the steps of:
   detecting an external device connected to the terminal;
   outputting receive data to the detected external device; and
   sending the data from the detected external device.

41. The communication method according to claim 40 wherein said communication terminal handles the information from the external device detected by the step of detecting said external device as the presence information within the terminal.

42. The communication method according to claim 40, wherein said communication terminal downloads a driver program for performing a linking operation to the external device detected by the step of detecting said external device.

43. The communication method according to claim 35, wherein said communication terminal limits the type of the presence information sent to said server, among said presence information.

44. The communication method according to claim 35, wherein an external image display and an external microphone are connected to said communication terminal, and said communication terminal is used to construct a teleconferencing system.

45. The communication method according to claim 44, comprising said server performing the step of billing depending on the duration and the number of times of utilization in said teleconferencing system.

46. The communication method according to claim 35, wherein said communication terminal sends/receives communication data to/from a game program executed by game program execution unit which executes the game program, the type of the game program executed by said game execution unit being held as said presence information, and the presence information being sent to said server, and
   wherein said server creates a group of the communication terminals including the same game program based on said presence information.

47. The communication method according to claim 46, wherein said server performs billing depending on the duration and the number of times of utilization of the game when said game program is executed.

48. The communication method according to claim 35, wherein a Transmission Control Protocol (TCP) is applied for sending/receiving communication data between said server and said communication terminal.

49. The communication method according to claim 48 wherein said communication terminal sends/receives electronic cash managed by management unit to/from another communication terminal.

50. The communication method according to claim 49, wherein said server performs billing depending on the number of times and the amount of sending/receiving said electronic cash when said electronic cash is sent/received.

51. The communication terminal according to claim 35, used for one-to-one communication and group communication in said communication terminal.

52. A program for a communication method used in a communication system in which a server receives data from a communication terminal on the sending side through a network, and delivers the data to a communication terminal on the receiving side through the network, making a computer on said communication terminal side perform the functions of:
   holding presence information representing state information regarding various states of said communication terminal and a user in holding unit; and
   modifying the operation of said communication terminal and performing send/receive data processing based on the presence information held in said holding unit.

53. The program according to claim 52, which causes a computer on said server side to perform the function of using the presence information from said communication terminal to create a group of communication terminals that perform communication.

54. The program according to claim 52 or 53, which causes the computer on said communication terminal side to perform functions of downloading from said server a program for performing modification of the operation of said communication terminal and send/receive data processing, and executing the program downloaded from said server.

* * * * *